United States Patent [19]

Schasser

[11] 4,088,878

[45] May 9, 1978

[54] STATIC CARD READER HAVING MULTIPLE SELECTABLE CODES

[75] Inventor: Donald S. Schasser, Pinckney, Mich.

[73] Assignee: Automatic Parking Devices, Inc., Farming, Mich.

[21] Appl. No.: 711,851

[22] Filed: Aug. 5, 1976

[51] Int. Cl.² .............................................. G06K 7/00
[52] U.S. Cl. ................................................. 235/436
[58] Field of Search ................. 235/61.11 R, 61.11 E, 235/61.7 B, 61.11 A; 340/347 DD

[56] References Cited

U.S. PATENT DOCUMENTS

| 3,340,409 | 9/1967 | Probert et al. | 235/61.11 A |
| 3,514,754 | 5/1970 | Schwend | 235/61.11 R |
| 3,835,301 | 9/1974 | Barney | 235/61.11 A |
| 3,864,549 | 2/1975 | Yaccino | 235/61.11 R |

*Primary Examiner*—Daryl W. Cook
*Attorney, Agent, or Firm*—Barnes, Kisselle, Raisch & Choate

[57] ABSTRACT

A static reader for use with cards carrying indicia readable in the form of a binary code at preselected locations thereon. The reader includes sensors for reading binary coded indicia on a card, a circuit for decoding the card indicia and a plurality of individually selectable switches at the outputs of the decoder for selecting any number of card codes to provide a pulsed output signal.

10 Claims, 4 Drawing Figures

U.S. Patent May 9, 1978 Sheet 1 of 2 4,088,878

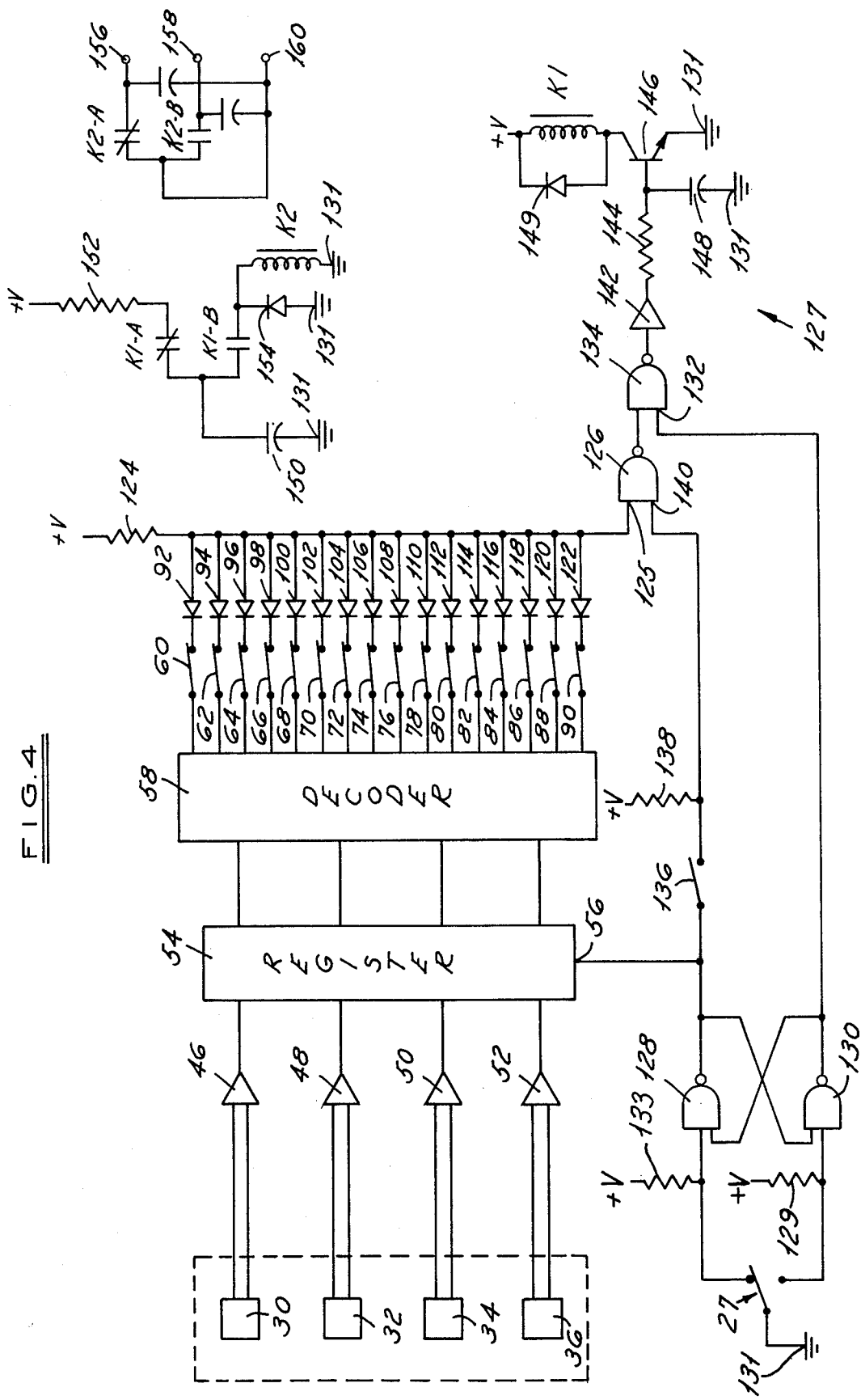

STATIC CARD READER HAVING MULTIPLE SELECTABLE CODES

The present invention relates to card readers and, more particularly, to improvements in static readers for use with cards carrying indicia at preselected locations thereon readable in the form of a binary code.

Objects of the present invention are to provide a card reader of the above-mentioned type which may be readily programmed or reprogrammed to be responsive to any one or more of the binary codes readable from a card inserted therein, which provides a pulsed output signal in response to cards bearing the preselected code or codes, and/or which may be selectively made responsive to any card inserted therein independently of its coded indicia.

Figure 1:
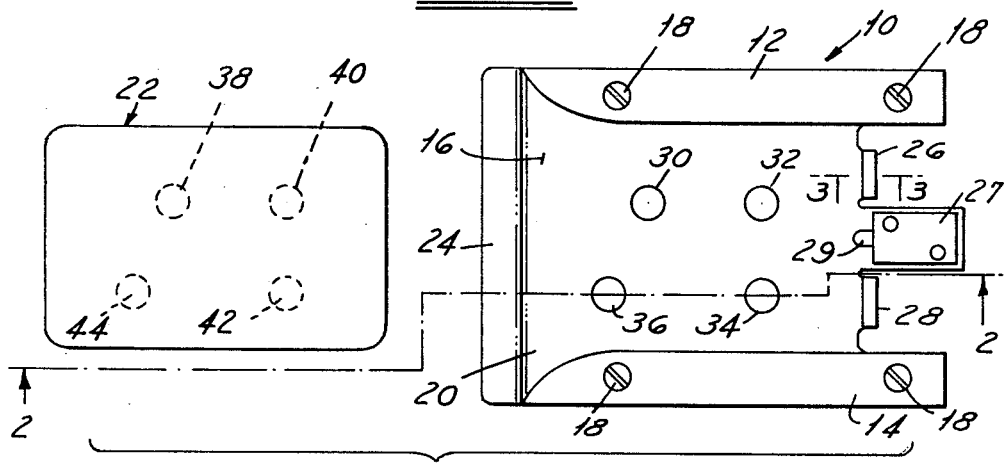
Figure 2:
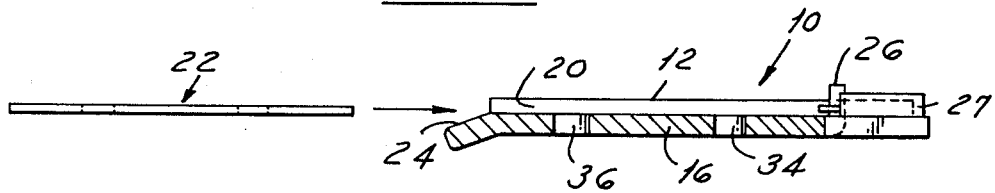
Figure 3:

The novel features which are considered to be characteristic of the present invention are set forth in particular in the appended claims. The invention itself, however, together with additional objects, features and advantages thereof, will be best understood from the following description when read in conjunction with the accompanying drawings in which:

FIG. 1 is a plan view schematically depicting a card reader of the type with which the present invention may be used;

FIGS. 2 and 3 are sectional views respectively taken along the lines 2—2 and 3—3 of FIG. 1; and FIG. 4 is a schematic diagram depicting a presently preferred embodiment of the improvements provided in accordance with the invention.

In FIGS. 1-3, a card reader 10 is depicted as comprising a pair of laterally spaced card guides 12,14 mounted on a base plate 16 by screws 18 to form a slot 20 into which a card of the type generally indicated at 22 may be slidably inserted. Base plate 20 is formed with a downwardly angulated front lip 24 to facilitate insertion of card 22. A pair of tabs 26,28 are bent upwardly from base plate 16, as best seen in FIG. 3, to limit insertion of card 22, and to position and hold stationary an inserted card such that indicia thereon may be read. A switch 27 is disposed on plate 16 adjacent slot 20 and has a switch actuator 29 extending into the slot for detecting insertion of a card. It will be recognized, of course, that suitable housing and support structure not depicted in the drawings will normally be provided for reader 10, such structure being readily apparent to the skilled artisan depending upon the environment in which the reader is to be used and not forming part of the present invention.

A plurality of sensor elements 30,32,34,36 are positioned at preselected locations adjacent slot 20 for registry with and detection of corresponding indicia 38,40,42,44 carried by card 22 when the card is inserted into the slot. Each sensor element is responsive to the presence or absence of adjacent indicia at a preselected location such that all of the sensor elements, taken together, provide a binary coded signal as a function of the card being read. Indicia 38-44 may take the form of permanent magnets or the like embedded within card 22, in which case sensor elements 30-36 may comprise reed switches of the type shown in Sedley U.S. Pat. No. 3,581,030, electromagnetic sensor coils of the type shown in Rogers et al U.S. Pat. Nos. 3,686,479 and 3,780,268 or Hall effect generators of the type shown in Rogers U.S. Pat. No. 3,648,021 and May et al U.S. Pat. No. 3,896,292. Indicia 38-44 may comprise raised embossments or the like on the surface of card 22, in which case the sensors may be suitable switches activated by such embossments and of the type shown in Schinner U.S. Pat. Nos. 3,299,298 and 3,463,890. Alternatively, indicia 38-44 may take the form of slots or holes punched at preselected locations in card 22, in which event sensors 30-36 may comprise suitable photodetectors, such as LED's, disposed across slot 20 in registry with suitable light sources (not shown) as taught by Douglas U.S. Pat. No. 3,383,513 and Gieringer et al U.S. Pat. No. 3,388,403. In summary, the type of sensor element to be provided is dictated by the particular type of readable indicia for which the reader is designed. Switch 27 and sensors 30-36 are connected by suitable conductors to an improved reader circuit depicted in FIG. 4.

More specifically, referring to FIG. 4, sensors 30,32,34,36 are respectively connected to input amplifiers 46,48,50,52 which include appropriate biasing circuitry for the sensors. Each amplifier provides a digital signal (logical one or logical zero) at its output in accordance with the presence or absence of indicia adjacent the corresponding sensor element. For example, if the presence of indicia is to be indicated as a logical one, and if adjacent indicia is sensed by elements 30,36 but not sensed by elements 32,34, then the binary coded signal at the collective output of amplifiers 46-52 will be "1001". The outputs of amplifiers 46-52 are connected to the data input lines of a four-bit register 54 having a strobe input 56. The data output lines of register 54 are connected to corresponding inputs of a four-line-to-sixteen-line decoder 58 which has a plurality of sixteen outputs to provide decoded signals indicative of the numerical value of the binary coded input thereto from register 54. Stated differently, depending upon the binary value of the four input signals, the one decoder output signal corresponding thereto will be low (logical zero) and the other fifteen outputs will all be high (logical one).

In accordance with one important aspect of the present invention, each of the sixteen output lines from decoder 58 is connected to one terminal of sixteen individually selectable switches 60-90, each having a second terminal connected to the cathode of a corresponding isolation diode 92-122. The anodes of diodes 92-122 are connected together through a resistor 124 to a positive voltage source, and to one input 125 of a NAND gate 126. Input 125 comprises a first input to reader output electronics 127. Thus, through selective closure of switches 60-90 (all of which are depicted in a normally closed condition) first input 125 will go low in response to detection of any one of a plurality of preselected card codes. Moreover, the reader electronics may be readily reprogrammed for different card codes by opening and/or closing one or more switches 60-90. Of course, the reader may be programmed for one card code only by merely closing the corresponding switch 60-90 and leaving the remainder open.

A pair of two-input NAND gates 128,130 have respective first inputs cross-coupled to the opposing gate output to form a conventional flip-flop, and second inputs respectively connected to the normally closed contact and the normally open contact of switch 27 which has its common contact connected to ground 131. The second inputs of gates 128,130 are also connected to the voltage source through the respective pull-up resistors 133,129. Thus, the output of gate 128 goes low and the output of gate 130 goes high when switch 27 detects insertion of a card 22 into slot 20 (FIGS. 1 and 2). The output of gate 130 is connected to an input 132 of a NAND gate 134, which comprises a second input to output electronics 127, to enable operation of the output electronics only when a card is detected in the reader. The output of gate 128 is connected to register strobe input 56 to strobe the outputs of amplifiers 46–52 into the register when a card is in a position to be read.

The output of gate 128 is also connected to one terminal of a normally open override switch 136 which has a second terminal connected through a pull-up resistor 138 to the voltage source. The junction of resistor 138 and switch 136 is connected to a second input 140 of gate 126, which comprises a third input to electronics 127. The output of gate 126 is connected to a second input of gate 134. Thus, the output of gate 126 goes high when either input 125 from decoder 58 or input 140 from gate 128 via switch 136 (when closed) goes low. Hence, closure of switch 136 overrides the reader and decoder circuitry, and provides the required input to the output electronics independently of the card code whenever a card is inserted into the reader slot. The reader may thereby be made to continue operation on a limited or standby basis if any of the reader or decoder electronics fail. During normal operation switch 136 remains open. When either of the inputs to gate 126 goes low, the output thereof goes high and, when enabling input 132 is high indicating that a card is in the reader slot, the output of gate 134 goes low.

The output of gate 134 is connected through an inverter 142 and a current limiting resistor 144 to the base of an NPN transistor 146 having its emitter connected to ground 131 and its collector connected through a relay coil K1 to the voltage source. It will be appreciated, of course, that gates 126,128,130,134, amplifiers 46–52 and 142, register 54, decoder 58 and, where required, sensors 30–36 are all connected in the usual fashion to receive power from the voltage source. A noise-suppression capacitor 148 is connected across the base-emitter junction of transistor 146. The usual diode 149 is connected in the reverse voltage direction across coil K1 to suppress inductive ringing in the coil when transitor 146 turns off. A charge collection capacitor 150 has one terminal connected to ground 131, and has a second terminal connected through a set of normally closed relay contacts K1-A associated with coil K1 and then through a resistor 152 to the voltage source. The junction of capacitor 150 and contact set K1-A is connected through a set of normally open contacts K1-B associated with coil K1, and then through a second relay coil K2 to ground 131. A diode 154 is connected in the reverse voltage direction across coil K2.

A set of normally closed contacts K2-A and a set of normally open contacts K2-B, both associated with relay coil K2, are connected in series between reader output terminals 156,158. The junction of contact sets K2-A and K2-B is connected to a third output terminal 160. The noise-suppression capacitors 162, 164 are respectively connected across contact sets K2-A,K2-B. Thus, capacitor 150 is normally charged to a preselected voltage level through closed contact set K1-A. When the output of gate 134 goes low, transistor 146 is turned on, coil K1 is energized, contact set K1-A is opened, contact set K1-B is closed and capacitor 150 is discharged through coil K2. Coil K2 is thereby energized for a time proportional to the preselected charge collected on capacitor 150, and contact sets K2-A and K2-B are cycled to provide pulsed output signals between output terminal pairs 156,160 and 158,160.

In view of the foregoing description, in which the improved card reader provided in accordance with the present invention has been described in conjunction with one presently preferred embodiment thereof, many modifications and variations will suggest themselves to skilled artisans. For example, although the invention has been described in conjunction with four sensors and a four-bit decoder for simplicity, it will be apparent that sensors and decoders may be readily added or subtracted where desired. Moreover, where reader 10 is to be controlled from a central computer location or the like, mechanical switches 60–90 and 136 may be readily replaced by appropriate electronic switches adapted for remote control, such as transistors or controlled rectifiers. Similarly, card detection switch 27 is depicted as a mechanical switch but may readily be replaced by an additional sensor element and input amplifier, etc. responsive to indicia at a preselected location on each card to sense insertion of a card into the reader. Accordingly, the invention is intended to embrace these and all other alternatives, modifications and variations as fall within the spirit and broad scope of the appended claims.

The invention claimed is:

1. In a card reader for use with a card carrying indicia readable in the form of a binary code at preselected locations thereon, and including means providing a slot for receiving a card and means positioned at preselected locations adjacent said slot and responsive to indicia on a card inserted into said slot for providing a binary coded signal as a function of such indicia, the improvement comprising decoder means for decoding said binary coded signal to provide a plurality of decoded signals each indicative of a selected value of said binary coded signal, output means for providing a reader output in response to a code signal, and means for connecting any selected number of said plurality of decoded signals to a first input of said output means for providing said code signal such that said reader output signal is at one time selectively responsive to any one or more of said plurality of decoded signals.

2. The improvement set forth in claim 1 wherein said connecting means comprises a plurality of switch means, each said switch means selectively connecting one of said plurality of decoded signals to said first input.

3. The improvement set forth in claim 2 wherein each said switch means comprises a mechanical switch having an open condition in which the corresponding decoded signal is disconnected from said first input and a closed condition in which said corresponding decoded signal is connected to said first input.

4. The improvement set forth in claim 1 further comprising means disposed adjacent said slot for detecting insertion of a card into said slot and means responsive to said detecting means for enabling operation of said reader only when a card has been inserted into said slot.

5. The improvement set forth in claim 4 wherein said enabling means comprises means connected to a second input of said output means to enable operation of said output means only when a card has been inserted into said slot.

6. The improvement set forth in claim 5 wherein said detecting means comprises a switch having a switch actuator disposed to be engaged by a card inserted into said slot.

7. The improvement set forth in claim 4 further comprising means for selectively connecting said detecting means to a third input of said output means to provide said output signal independently of said plurality of decoded signals whenever a card is inserted into said slot.

8. The improvement set forth in claim 1 wherein said output means comprises means for providing a pulsed signal as said output signal.

9. The improvement set forth in claim 8 wherein said pulsed signal providing means comprises charge storage means, means normally connecting said charge storage means to a source of electrical power such that said charge storage means is charged to a preselected voltage level, and means responsive to said code signal at said first input for disconnecting said charge storage means from said source of electrical power and connecting said charge storage means to provide a said output signal having a pulse duration proportional to said preselected charge.

10. The improvement set forth in claim 9 wherein said code signal responsive means comprises a relay having a coil connected to be energized in response to said code signal, a pair of normally-closed contacts comprising said means normally connecting said charge storage means to said source of electrical power and a pair of normally open contacts connected to said charge storage means to provide said output signal.

* * * * *